US012683919B2

(12) United States Patent
Liu et al.

(10) Patent No.: US 12,683,919 B2
(45) Date of Patent: Jul. 14, 2026

(54) METHOD AND SYSTEM FOR PROCESSING INFORMATION ACROSS BROADCAST PLATFORMS

(71) Applicant: HYTTO PTE. LTD, Singapore (SG)

(72) Inventors: Dan Liu, Guangzhou (CN); Jilin Qiu, Guangzhou (CN)

(73) Assignee: HYTTO PTE. LTD., Singapore (SG)

( * ) Notice: Subject to any disclaimer, the term of this patent is extended or adjusted under 35 U.S.C. 154(b) by 112 days.

(21) Appl. No.: 18/938,415

(22) Filed: Nov. 6, 2024

(65) Prior Publication Data

US 2025/0063008 A1      Feb. 20, 2025

Related U.S. Application Data

(63) Continuation-in-part of application No. 17/806,078, filed on Jun. 8, 2022, now Pat. No. 12,155,899.

(51) Int. Cl.
| | |
|---|---|
| *H04L 51/046* | (2022.01) |
| *G06F 3/0482* | (2013.01) |
| *G06F 3/0484* | (2022.01) |
| *H04L 51/216* | (2022.01) |

(52) U.S. Cl.
CPC .......... *H04L 51/046* (2013.01); *G06F 3/0482* (2013.01); *G06F 3/0484* (2013.01); *H04L 51/216* (2022.05)

(58) Field of Classification Search
CPC ... H04L 51/046; H04L 51/216; G06F 3/0482; G06F 3/0484; H04N 21/4788; H04N 21/478; H04N 21/2187
See application file for complete search history.

(56) References Cited

U.S. PATENT DOCUMENTS

| | | | |
|---|---|---|---|
| 8,608,644 | B1 | 12/2013 | Davig |
| 9,762,515 | B1 | 9/2017 | Olivares et al. |
| 10,616,666 | B1 | 4/2020 | Pontiff et al. |
| 11,122,003 | B1 | 9/2021 | Garg et al. |

(Continued)

FOREIGN PATENT DOCUMENTS

WO        2021185302 A1      9/2021

OTHER PUBLICATIONS

"Lovense Developer", online publication at https://developer.lovense.com/#introduction printed on Jun. 8, 2022, last updated Jun. 6, 2022.

(Continued)

*Primary Examiner* — Brian Whipple
(74) *Attorney, Agent, or Firm* — Holtz, Holtz & Volek PC

(57) ABSTRACT

A method for processing communication across multiple broadcast platforms includes connecting a user device to a plurality of broadcast platforms. A chat container is provided in a user interface of the user device. The chat container is configured to provide centralized information management across each of the plurality broadcast platforms. One or more broadcast platforms of the plurality of broadcast platforms are selected as a target broadcast platform in response to a selection operation on the chat container. A user message is sent to at least one viewer device among the plurality of viewer devices in response to a messaging operation on the chat container. The at least one viewer device is in communication with the user device via the target broadcast platform.

20 Claims, 8 Drawing Sheets

(56)      References Cited

U.S. PATENT DOCUMENTS

| | | | |
|---|---|---|---|
| 2006/0174207 A1* | 8/2006 | Deshpande | G06Q 10/107 |
| | | | 715/758 |
| 2007/0162930 A1 | 7/2007 | Mickle et al. | |
| 2008/0010122 A1 | 1/2008 | Dunmire et al. | |
| 2008/0249818 A1 | 10/2008 | Olliphant et al. | |
| 2011/0078718 A1 | 3/2011 | Jakobi et al. | |
| 2015/0212984 A1 | 7/2015 | Bowden | |
| 2017/0085600 A1 | 3/2017 | Carter et al. | |
| 2017/0337274 A1 | 11/2017 | Ly et al. | |
| 2018/0260796 A1 | 9/2018 | Mcdonald et al. | |
| 2018/0337796 A1 | 11/2018 | Pavlin et al. | |
| 2020/0068262 A1 | 2/2020 | Saldana et al. | |
| 2020/0276504 A1 | 9/2020 | Liu | |
| 2020/0364727 A1 | 11/2020 | Scott-Green et al. | |
| 2021/0043187 A1 | 2/2021 | Ahn et al. | |
| 2023/0132073 A1 | 4/2023 | Zheng et al. | |

OTHER PUBLICATIONS

"Making Money on YouTube with Super Chat and Sticker", YouTube, uploaded by YouTube Creators, Aug. 19, 2021, youtube.com /watch?v=KDZJULNpVWo (Year: 2021).

Macdonald, "Can we chat? Hello Super Chat!", YouTube Official Blog, blog.youtube/news-and-events/ can-we-chat-hello-super-chat/. Jan. 12, 2017 (Year: 2017).

Tassi, "'Fortnite' Legend Dr.Lupo Pulls Off A Record-Breaking Charity Stream Raising Nearly $1 M.", Forbes, forbes.com/sites/paultassi/2019/06/23/fortnite-legend-drlupo-pulls-off-a-record-breaking-charity-stream-raising-nearly-1 m/?sh=5d72a4205dc4. Jun. 23, 2019 (Year: 2019).

* cited by examiner

Fig. 5

```
┌─────────────────────────────────────────────────────┐
│                 TIP HISTORY WINDOW                    │
│                                                       │
│  Per Time Frame                                       │
│                                                       │
│  Total:  $125   $220   $1,240   $1,170      $12,395   │
│                                                       │
│  BP1:    $20    $35    $240     $300        $3,100    │
│  BP2:    $40    $55    $300     $265        $2,800    │
│  BP3:    $30    $70    $290     $280        $2,955    │
│  BP4:    $35    $60    $410     $325        $3,540    │
│                                                       │
└─────────────────────────────────────────────────────┘
```

Fig. 6

```
┌─────────────────────────────────────────────────────┐
│               USER RECORDS WINDOW                     │
│                                                       │
│  RANK    BP            USERNAME       Total Tips Score│
│  1       BP1 [VIP]     RALPH_75       4301            │
│  2       BP4           CARLOS$1       3878            │
│  3       BP3           TWINZ_10       1092            │
│  4       BP3 [VIP]     ERLGRY88       312             │
│  5       BP2           FPG_1976       190             │
│                                                       │
└─────────────────────────────────────────────────────┘
```

Fig. 7

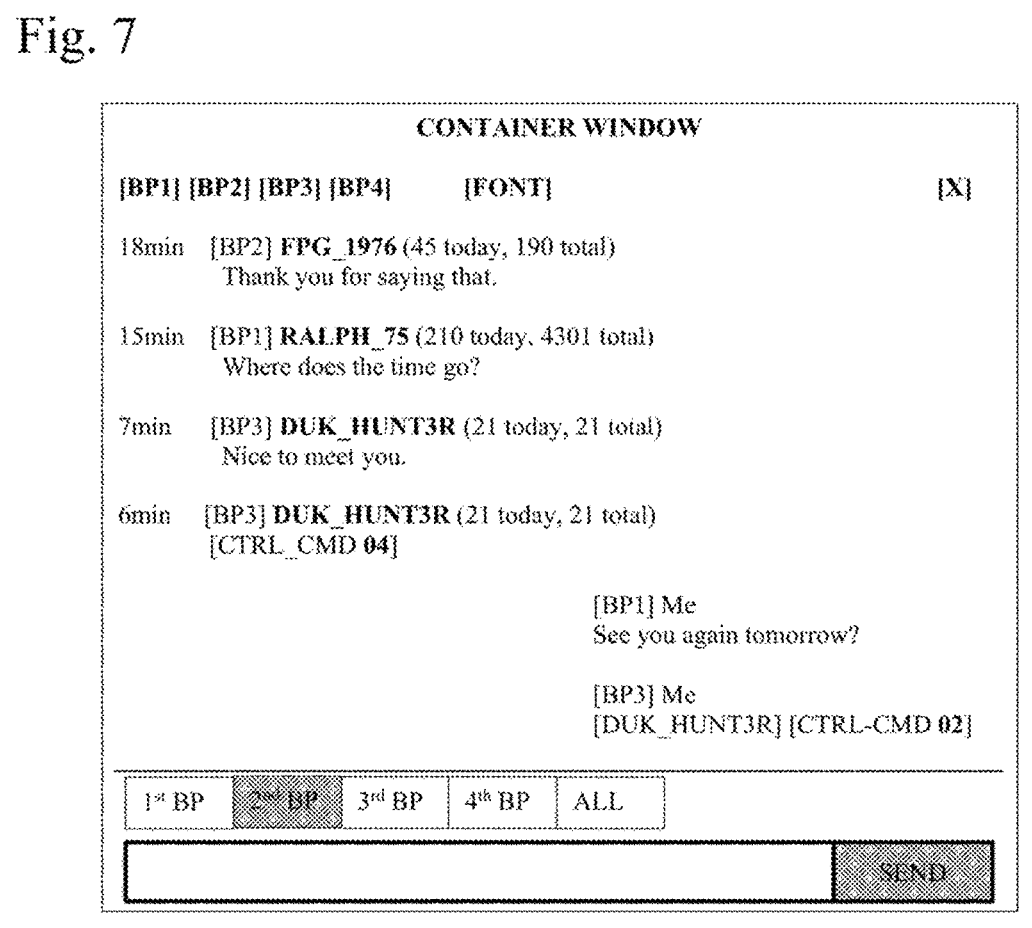

CONTAINER WINDOW

[BP1] [BP2] [BP3] [BP4]      [FONT]         [X]

18min    [BP2] FPG_1976 (45 today, 190 total)
       Thank you for saying that.

15min    [BP1] RALPH_75 (210 today, 4301 total)
       Where does the time go?

7min    [BP3] DUK_HUNT3R (21 today, 21 total)
       Nice to meet you.

6min    [BP3] DUK_HUNT3R (21 today, 21 total)
       [CTRL_CMD 04]

[BP1] Me
                   See you again tomorrow?

[BP3] Me
                   [DUK_HUNT3R] [CTRL-CMD 02]

| 1st BP | 2nd BP | 3rd BP | 4th BP | ALL |
|--------|--------|--------|--------|-----|

[ SEND ]

METHOD AND SYSTEM FOR PROCESSING INFORMATION ACROSS BROADCAST PLATFORMS

CROSS REFERENCE TO RELATED APPLICATIONS

This application is a continuation-in-part of U.S. application Ser. No. 17/806,078, filed on Jun. 8, 2022. The above application is hereby incorporated by reference in its entirety.

TECHNICAL FIELD

The present disclosure relates to broadcast platforms and, more specifically, to a method and system for processing information across broadcast platforms.

DISCUSSION OF THE RELATED ART

Adult toys are devices designed for sexual stimulation of a user. Adult toys may be able to produce a wide range of movements, referred to herein as "operational modes." These operational modes can provide sexual stimulus by various movements such as vibrations and other repetitive movements.

Traditionally, a user has been responsible for manually activating the adult toy device and switching between its many operational modes. More recently, adult toys have been designed that allow for remote control over a computer network such as the Internet to allow a remote user to control the operational modes of the adult toy being used by a local user.

More recently, the use of these adult toys has been incorporated into the broadcasting/streaming of real-time content and the remote control of these adult toys may be passed to one or more viewers of the content.

U.S. Pat. No. 9,762,515, which is incorporated by reference herein in its entirety, relates to a system and method for allowing one or more viewers to remotely interact with content creators, for example, by enabling the viewers to provide monetary tips to the content creator during online video chat sessions, wherein the content creator may pre-define tipping parameters by which a viewer may initiate one or more operational modes of the adult toy based on an amount of tip provided.

The adult toy can be Wi-Fi or Bluetooth enabled to receive commands directly from a remotely hosted server that administers the operational modes of the adult toy via a web browser extension, a website hosting an online video chat session, or the adult toy may be connected, via Wi-Fi or Bluetooth, to an application installed on a device operated by the content creator, such as a personal computer (PC), smart phone, tablet computer, etc. The application may communicate with the web browser extension to relay commands to the adult toy therefrom. In this way, the browser extension or website can generate live control links to enable certain viewers to exert real-time control over the operational modes of the adult toy.

Content creators may wish to simultaneously broadcast their live streams across multiple platforms. However, as each platform may have its own user interface, the task of interacting with the viewers of each platform can be distracting as the content creator must juggle viewer interactions across multiple different user interfaces.

SUMMARY

A method for processing communication across multiple broadcast platforms includes connecting a content creator device to a plurality of broadcast platforms. At least a first viewer device, of a plurality of viewer devices, is connected to a first broadcast platform of the plurality of broadcast platforms. At least a second viewer device, of the plurality of viewer devices, is connected to a second broadcast platform of the plurality of broadcast platforms. A chat container is provided in a user interface of the content creator device. The chat container is configured to provide centralized information management across each of the plurality broadcast platforms. One or more broadcast platforms of the plurality of broadcast platforms are selected as a target broadcast platform in response to a selection operation on the chat container. A content creator message is sent to at least one viewer device among the plurality of viewer devices in response to a messaging operation on the chat container. The at least one viewer device is in communication with the content creator device via the target broadcast platform.

The method may further include displaying, through the chat container, viewer information from the plurality of broadcast platforms, wherein the viewer information is associated with at least one viewer device in communication with the content creator device via at least one of the plurality of broadcast platforms.

The content creator device may be configured to broadcast a video stream and send content creator messages to the plurality of viewer devices via at least one of the plurality of broadcast platforms. The viewer device may be configured to watch the broadcasted video stream and send the viewer information to the content creator device via at least one of the plurality of broadcast platforms.

The viewer information may include comment messages, private messages, tipping messages, and/or statistical data. The comment message may include a viewer ID, comment content, comment time, and/or a name of a broadcast platform, among the plurality of broadcast platforms, via which the comment message is sent. The tipping message may include the viewer ID, a tipping value, a tipping time, and/or the name of the broadcast platform, among the plurality of broadcast platforms, via which the tipping message is sent. The statistical data may include a number of viewer devices of the plurality of viewer devices, tipping statistics for a particular broadcast platform of the plurality of broadcast platforms, tipping statistics for a particular viewer device, of the plurality of viewer devices, and/or identity information for a particular viewer device, of the plurality of viewer devices.

The method may further include sending a reply message from the content creator device to the at least one viewer device, of the plurality of viewer devices, and synchronously showing the reply message, in a broadcast platform of the plurality of broadcast platforms, via which the at least one viewer is in communication with the content creator device, in response to a reply operation on the comment message or the tipping message in the chat container.

The viewer information may further include an indication that a viewer device, of the plurality of viewer devices, is associated with a peripheral device.

The peripheral device may be an adult toy. The adult toy may be connected to the viewer device by a wired or wireless connection. The indication may include information pertaining to whether the wired or wireless connection is operational and/or information pertaining to a type of the adult toy.

The chat container may be presented as a floating window on a web page, as an embedded element in a web page, and/or as an independent client application.

Each of the plurality of broadcast platforms may be separately displayed on different web pages, and the chat container may be presented in one of the web pages for a particular broadcast platform.

The step of selecting one or more broadcast platforms as the target broadcast may include, based on the target broadcast platform and the content creator message, calling a preprogrammed script to simulate an input operation on a web interface associated with the target broadcast platform, so as to send the content creator message to the target broadcast platform or sending the content creator message from the chat container to the target broadcast platform based on a software development kit which interfaces the chat container with the target broadcast platform, wherein the software development kit is integrated into a development of the target broadcast platform.

The step of displaying, through the chat container, viewer information from the plurality of broadcast platforms may include, responsive to receiving front-end data from the plurality of broadcast platforms, processing the front-end data to obtain the viewer information to be displayed through the chat container, or receiving the viewer information from the at least one of the plurality of broadcast platforms to the chat container based on a software development kit which interfaces the chat container with the target broadcast platform, wherein the software development kit is integrated into a development of the at least one of the plurality of broadcast platforms.

The method may further include performing information conversion on the viewer information in the chat container, wherein the information conversion includes text-to-voice, voice-to-text, translation, and/or voice prompt.

A system for communication across multiple broadcast platforms includes a control server for connecting to a first broadcast platform, a second broadcast platform, and generating a chat container. A content creator terminal displays the chat container, receives a content creator message and a selection of a target broadcast platform from among the first and second broadcast platforms, generates a live stream broadcast, transmits the live stream broadcast to each of the first and second broadcast platforms, and transmits the content creator message to the target broadcast platform. A first viewer terminal is connected to the first broadcast platform and is configured to receive the generated live stream broadcast therethrough. A second viewer terminal is connected to the second broadcast platform and is configured to receive the generated live stream broadcast therethrough.

The system may further include a database connected to either the control server or the content creator terminal and configured to store and retrieve information pertaining to the first viewer terminal and/or the second viewer terminal and provide the retrieved information to the content creator terminal for display.

The system may further include an adult toy connected to the content creator terminal via a wired or wireless connection and configured to be controlled by either by the first viewer terminal via the first broadcast platform and the control server or by the second viewer terminal via the second broadcast platform and the control server.

The system may further include an adult toy connected to either the first viewer terminal or to the second viewer terminal via a wired or wireless connection and configured to be controlled by the content creator terminal either by the first viewer terminal via the first broadcast platform and the control server or by the second viewer terminal via the second broadcast platform and the control server.

A non-transitory computer-readable medium storing a program including instructions that, when executed by a processor, causes communication to be processed across multiple broadcast platforms, by connecting a content creator device to a plurality of broadcast platforms, connecting at least a first viewer device, of a plurality of viewer devices, to a first broadcast platform of the plurality of broadcast platforms, connecting at least a second viewer device, of the plurality of viewer devices, to a second broadcast platform of the plurality of broadcast platforms, providing a chat container in a user interface of the content creator device, wherein the chat container is configured to provide centralized information management across each of the plurality broadcast platforms, responsive to a selection operation on the chat container, selecting one or more broadcast platforms of the plurality of broadcast platforms as a target broadcast platform, and responsive to messaging operation on the chat container, sending a content creator message to at least one viewer device among the plurality of viewer devices, wherein the at least one viewer device is in communication with the content creator device via the target broadcast platform.

The instructions, when executed by the processor, may further cause displaying, through the chat container, viewer information from the plurality of broadcast platforms, wherein the viewer information is associated with at least one viewer device in communication with the content creator device via at least one of the plurality of broadcast platforms.

The instructions, when executed by the processor, may further cause the content creator device to be configured to broadcast a video stream and send content creator messages to the plurality of viewer devices via at least one of the plurality of broadcast platforms, and the viewer device is configured to watch the broadcasted video stream and send the viewer information to the content creator device via at least one of the plurality of broadcast platforms.

The viewer information may include comment messages, private messages, tipping messages, and/or statistical data. The comment message may include a viewer ID, comment content, comment time, and/or a name of a broadcast platform, among the plurality of broadcast platforms, via which the comment message is sent. The tipping message may include the viewer ID, a tipping value, a tipping time, and/or the name of the broadcast platform, among the plurality of broadcast platforms, via which the tipping message is sent. The statistical data may includes a number of viewer devices of the plurality of viewer devices, tipping statistics for a particular broadcast platform of the plurality of broadcast platforms, tipping statistics for a particular viewer device, of the plurality of viewer devices, and/or identity information for a particular viewer device, of the plurality of viewer devices.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 5 is a flow chart illustrating an approach for processing information across broadcasting platforms in accordance with exemplary embodiments of the present disclosure;

FIG. 6 is a simplified example of a user records window in accordance with exemplary embodiments of the present invention;

FIG. 7 is a chat container window in accordance with exemplary embodiments of the present invention;

DETAILED DESCRIPTION OF THE DRAWINGS

Figure 1:
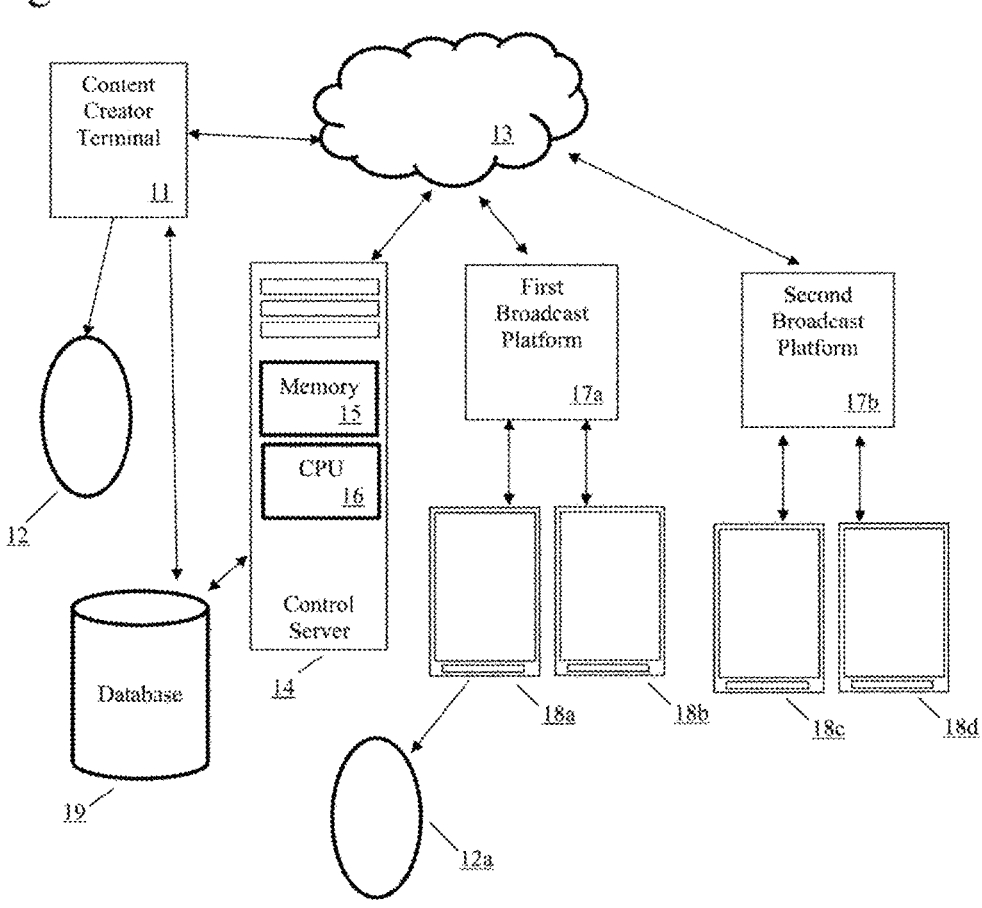
FIG. 1 is a schematic diagram illustrating a system for processing information across broadcasting platforms in accordance with exemplary embodiments of the present disclosure.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention relate to systems and methods for effectively managing viewer interactions across multiple diverse broadcasting/live streaming platforms so that a content creator may perform viewer engagement functions within a single consolidated user interface that allows for chatting, the reception of monetary tips, and the remote control of operational modes of an adult toy, among other engagement functions. As an example, a method for processing communication across multiple broadcast platforms, including: providing a chat container in a user interface of a user device, wherein the chat container is configured to provide centralized information management across a plurality of broadcast platforms, and wherein at least a first chat partner device of a plurality of chat partner devices connects to the user device via a first broadcast platform of the plurality of broadcast platforms, and at least a second chat partner device of the plurality of chat partner devices connects to the user device via a second broadcast platform of the plurality of broadcast platforms; responsive to a selection operation on the chat container, selecting one or more broadcast platforms of the plurality of broadcast platforms as a target broadcast platform; and responsive to a messaging operation on the chat container, sending a user message to at least one chat partner device among the plurality of chat partner devices, wherein the at least one chat partner device is in communication with the user device via the target broadcast platform, wherein the chat container is configured to display the user message, a text message of user of the first chat partner device from the first broadcast platform, and a text message of user of the second chat partner device from the second broadcast platform, and wherein the chat container is further configured to display a username of the user of the first chat partner device, and an interaction history of the user of the first chat partner proximate to the display of the text message of the user of the first chat partner device, and wherein the chat container is further configured to display a username of the user of the second chat partner device, and an interaction history of the user of the second chat partner device proximate to the display of the text message of the user of the second chat partner device; wherein the interaction history is coded and/or shows an icon to represent the broadcast platform interaction information of the interaction history originated from.

As one example, the user device may be a viewer device and the chat partner device may be a content creator device. As another example, the user device may be a content creator device and the chat partner device may be a viewer device. The following relevant embodiments are described hereinafter in terms of the user device may be a content creator device and the chat partner device may be a viewer device. However, in the case that the user device may be a viewer device and the chat partner device may be a content creator device, the following embodiments may also be referred to, and will not be repeated herein.

In some embodiments, the "interaction history" includes various types, including a chat interaction aspect, a reward interaction aspect, and a toy operation interaction aspect. In the chat interaction aspect, the chat records and communication details with different chat partners are covered; in the reward interaction aspect, the reward amount, time, and platform information of each chat partner are recorded; and in the toy operation interaction aspect, the operation details of the toys associated with the chat partners are included, such as the operation time, mode, and intensity, etc., which comprehensively records the history of the user's behaviors with the chat partners in different forms of interactions, so as to help the user review, analyze and manage the interaction experience.

As used herein, a user engaged in the performance of the live stream/broadcast may be referred to as a content creator, although it is to be understood that this user may be a performer, model, etc., and the actions described herein as those of the content creator may be divided among multiple different users.

As used herein, users engaged in the viewing of the live stream/broadcast may be referred to as viewers, although they may also contribute to the performance in some manner such as by controlling the operational modes of an adult toy being used by the content creator.

FIG. 1 is a schematic diagram illustrating a system for processing information across broadcasting platforms in accordance with exemplary embodiments of the present disclosure. A content creator may utilize a content creator terminal 11, which may be a computing device such as a personal computer (PC), a mobile device such as a smartphone, a tablet computer, or a teleconferencing system. The content creator terminal 11 may access a control server 14 across a computer network 13, such as the Internet. The control server 14 may manage communications between the content creator terminal 11 and a plurality of broadcast platforms (shown here as including a first broadcast platform 17*a* and a second broadcast platform 17*b*). Each broadcast platform 17 (where 17={17*a*, 17*b*, . . . }) may be a streaming platform or social network platform offering live streams, such as YOUTUBE LIVE offered by Alphabet, Inc., INSTAGRAM LIVE or FACEBOOK LIVE offered by Meta Platforms, Inc., TWITCH offered by Amazon, Inc., TIK-TOK offered by ByteDance, etc.

Various viewer terminals 18 (where 18={18*a*, 18*b*, 18*c*, 18*d*, . . . }) may be connected to one of the broadcast platforms 17. For example, a first viewer terminal 18*a* and a second viewer terminal 18*b* are connected to the first broadcast platform 17*a* and a third viewer terminal 18*c* and a fourth viewer terminal 19*d* are connected to the second broadcast platform 17*b*. These connections may also be over a computer network 13, such as the Internet.

Rather than the content creator terminal 11 being separately connected to each of the broadcast platforms 17, the content creator terminal is configured to display a chat container managed by the control server 14. The control server 14 may therefore manage a session for each of the broadcast platforms 17 and gather messages from each of the broadcast platforms 17 and display them on the content creator terminal 11 within the chat container. Similarly, the chat container may be used by the content creator terminal 11 to select one or more target broadcast platforms, from among the broadcast platforms 17, receive a message, and send that message to the selected broadcast platforms so that the chat container, under the management of the control server 14, may organize and display communications from among the plurality of broadcast platforms within a singular user interface.

The control server 14 may include, for example, a central processing unit (CPU) 16 and system memory 15. However, the control server 14 may be a same device as the content creator terminal 11. A database 19, that is connected to either the content creator terminal 11 or the control server 14, may store and retrieve information pertaining to the various viewer terminals 18 (or user accounts thereof) so that a synopsis of each viewer terminal 18 may be displayed in conjunction with their messages within the chat container or in a separate window. This information may include data such as a viewer's name, tips given, and other details and preferences that may facilitate the content creator's interaction with that viewer.

According to one approach, the content creator terminal 11 may be directly logged in to each of the broadcast platforms 17 and the control server 14 may access the broadcast platforms 17 via the connection established by the content creator terminal 11. However, according to another approach, the control server 14 may be directly logged in to each of the broadcast platforms 17, on behalf of the content creator, and the content creator terminal 11 may access the broadcast platforms 17 via the control server 14.

However, regardless of the manner of connection, messages from each of the viewer terminals 18, via each of the broadcast platforms 17, are consolidated within the chat container and the chat container may also be used to select a target broadcast platform and send an input message to the target broadcast platform. In this way, the chat container provides the content creator with a consolidated user interface for simultaneously interacting with multiple viewers across multiple different broadcast platforms.

A first adult toy 12 may be connected to the content creator terminal 11 via a wired or wireless connection. Examples of suitable wireless connections include Wi-Fi, Bluetooth, NFC, Zigbee, etc. Control of the operational modes of the first adult toy 12 may be remotely provided by one of the viewer terminals via the corresponding broadcast platform 17, the computer network 13, and, in some instances, the control server 14. The chat container may display to the content creator which viewer has initiated which operational mode to the first adult toy 12 and the content creator may also use the chat container to allow and deny operational control of the first adult toy 12 by a desired viewer.

Similarly, a second adult toy 12*a* may be connected to one of the viewer terminals 18*a* via a similar wired or wireless connection and control of the operational modes of the second adult toy 12*a* may be granted to the content creator, via the chat container.

The Control Server 14 may access each of the broadcast platforms 17 either by a software development kit and/or one or more APIs thereof, so that viewer messages may be retrieved for incorporation into the chat container and content creator messages, entered into the chat container, may be entered into the target broadcast platform.

Alternatively, where no software development kit is provided, the Control Server 14 may run various preprogramed scripts to simulate human interaction with each of the broadcast platforms 17 to perform the same functions.

These preprogrammed scripts may be embodied as JavaScript files, e.g., as different node.js files targeted on different third-party broadcast platforms using different rules of regular expression (like a Web crawler). Some examples of preprogrammed scripts are provided below:

receiveTip

Call this method when the model receives a tip in the chat room of the third-party broadcast platform. The chat container will receive, sort out, and display the information according to these parameters:

```
/**
 * receiveTip
 * @param {number} amount //tip amount that the model receives
 * @param {string} tipperName //this is the tipper's Screen Name
 */
camExtension.receiveTip(amount, tipperName)
``` receiveMessage

Call this method when the model receives a message in the chat room of the third-party broadcast platform. The chat container will receive, sort out, and display the information according to these parameters:

```
/**
 * receiveMessage
 * @param {string} userName //the sender's Screen Name
 * @param {string} content //the message just sent by the sender
 */
camExtension.receiveMessage(userName, content)
``` sendMessage

Call this method when the model sends or replies message to different platform. The chat container will forward the information according to these parameters:

```
/**
 * sendMessage
 * @param {string} platformName the selected platform's Name
 * @param {string} content //the message just sent by the sender
 */
camExtension.sendMessage(platformName, content)
```

Figure 2:
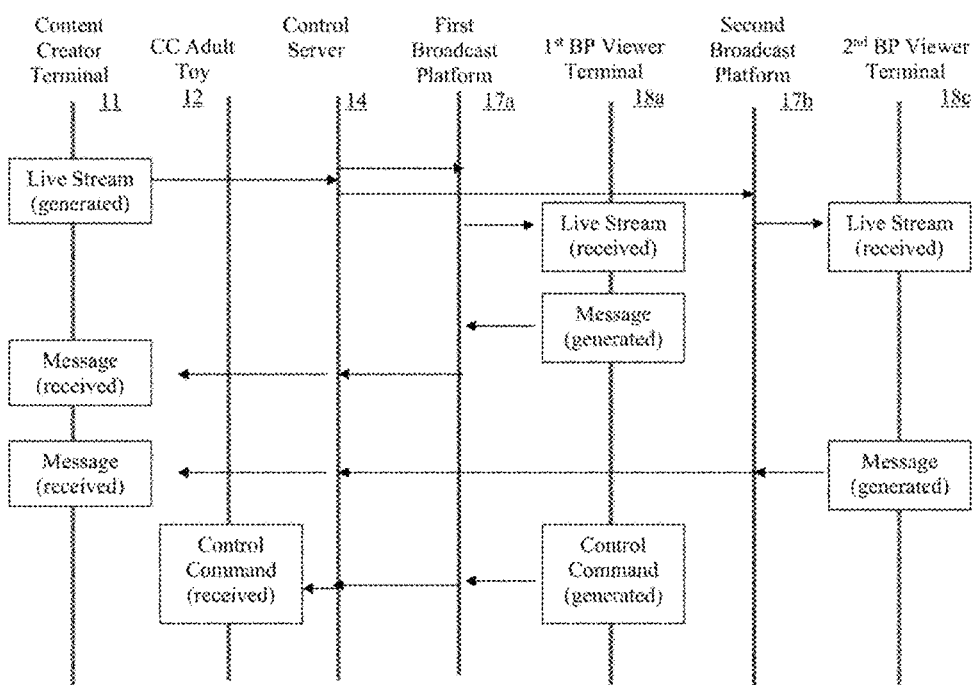
FIG. 2 is a diagram illustrating a way in which messages may be passed according to the above-described communications system.

FIG. 2 is a diagram illustrating a way in which messages may be passed according to the above-described communications system. The content creator terminal 11 may generate a live stream and send that live stream to the control server 14 which, by virtue of managing sessions with broadcast platforms, may send the live stream to each of the first 17*a* and second 17*b* broadcast platforms where they would be viewed by the first 18*a* and second 18*c* viewer terminals, respectively.

When a message is generated in one of the viewer terminals, for example, the first broadcast platform viewer terminal 18*a*, that message is sent, via the corresponding broadcast platform 17*a* to the control server 14, where it is inserted into the chat container displayed on the content creator terminal 11. Where a message is generated in the second broadcast platform viewer terminal 18*c*, that message may pass through the second broadcast platform 17*b* to the control server 14, where it is inserted into the chat container displayed on the content creator terminal 11.

A message created within the chat container selecting one or more broadcast platforms as target, may be sent from the content creator terminal 11 to the control server 14, to the targeted broadcast platform. If the message is a private message, it may be sent only to a particular viewer within the target broadcast platform and so an option to select a target viewer may also be provided by the chat container for use with private messages. As used herein, messages may be understood to be multimedia messages and may include text, emoji, images, audio files, video files, and also control commands for adult toys.

As the content creator may have one or more adult toys associated with the content creator device and as one or more of the viewers may have adult toys associated with their respective devices, the chat container may be used by the content creator to both issue control commands to activate the various operational modes of the viewer's adult toys, or to see in text form, which viewers have sent which control commands to the content creator's adult toy. Each control command may be displayed in the form of a message within the chat container and the content creator may use the message generation feature of the chat container to issue a control command to operate a desired adult toy of a desired viewer in a desired operational mode. The control commands, so entered, may be interpreted by the control server and the control server may then activate the operational modes of the desired viewer's adult toy via a means of remote operation specific to the type of adult toy being remotely operated, for example, by the control server passing a command along to another remote server responsible for the remote control of adult toys. Similarly, the control server may keep track of how the content creator's adult toy is being activated by viewers and then represent these actions as control commands within the chat container.

In allowing for the content creator to control the operational modes of the adult toys of the viewers, the chat container may additionally provide a pulldown or popup menu of operational modes for the adult toy of each viewer who has such a connected device associated with their terminal/device. The control server may also arbitrate remote access of the content creator's adult toy according to a set of rules, such as a required minimum tip value for implementing each operational mode of each adult toy. The content creator may see this set of rules and may make adjustments thereto using the chat container or a related window.

For example, the first broadcast platform viewer terminal 18*a* may generate a control command which may be relayed through the first broadcast platform 17*a* and the control server 14 and may then be sent to the adult toy 12 (either directly through the control server 14, as shown, or via the content creator terminal 11).

It is noted that where the broadcast platform sessions are managed by the content creator terminal 11 directly, the control server 14 may send and receive all its messages and commands via the content creator terminal 11.

Figure 3:
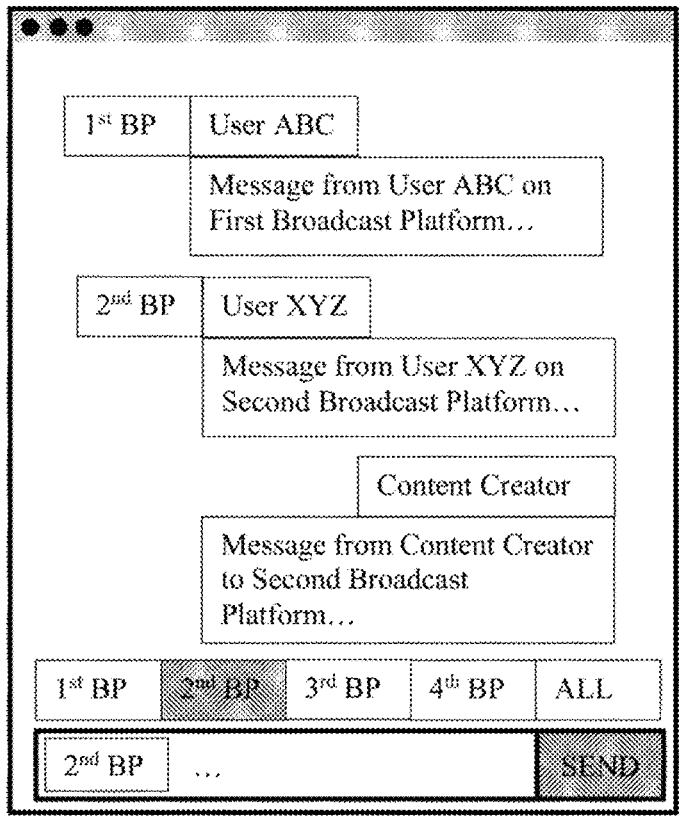
FIG. 3 is a diagram illustrating a chat container according to an exemplary embodiment of the present invention.

FIG. 3 is a diagram illustrating a chat container according to an exemplary embodiment of the present invention. As can be seen from this figure, the chat container provides the content creator with a consolidated view of messages from different users of different broadcast platforms and also provides the content creator with a means of selecting a target broadcast platform so that a message may be generated and sent to the target broadcast platform via input within the chat container. The chat container may further provide options for sending multimedia messages such as images, sounds, video, and adult toy controls via the chat container and these multimedia messages may also be sent as private messages to individual users.

Figure 4:
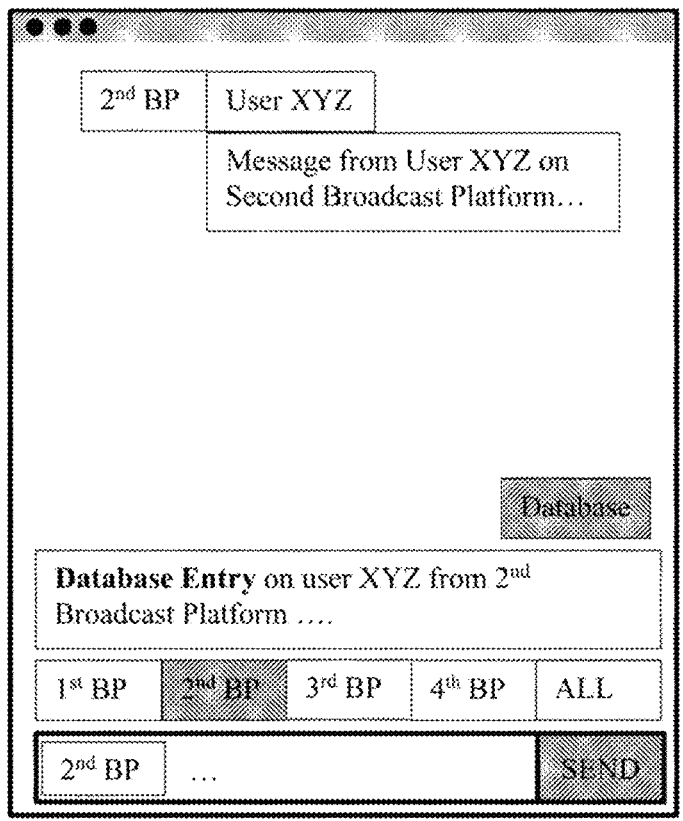
FIG. 4 is a diagram illustrating a chat container according to an exemplary embodiment of the present invention.

FIG. 4 is a diagram illustrating a chat container according to an exemplary embodiment of the present invention. As can be seen from this figure, the chat container further provides a display of a database entry for a selected viewer. The chat container may further provide a means of entering information into the database, for example, by selecting a database button and a particular viewer so that the text box may be used to store new information into the database entry for that viewer. The chat container, or another element running on the control server 14, may also automatically store data retrieved from respective broadcast platforms, to the database, such as personal information, tips given, preferences, etc.

The database may additionally be used to store a history of tips given by each broadcast platform and/or by each viewer. The tip history may be loaded from the database from the content creator UI and displayed within the content creator UI, either within the chat container or within a separate window. FIG. 5 is a diagram illustrating a tip history window in accordance with exemplary embodiments of the present invention. As may be seen from this diagram, a tip history may be organized by broadcast platform and may show tips earned per platform during a predefined time frame. so that the content creator may more easily visualize tip earnings across multiple broadcast platforms, within a singular window.

The database may additionally be used to store records of viewers including the identity of VIP users, a number, unique ID or usernames, IP addresses, broadcast platforms, chat rooms, broadcast rooms, etc. and this information may be recalled from the database and displayed either within the chat container or within a separate window. For example, the chat container may display all desired information within the content creator UI, both for a current broadcast session and overall. This information may therefore be displayed within a single window, across all broadcast platforms, for example, without having to interact with another user interface or pressing redundant buttons. FIG. 6 is a simplified example of a user records window in accordance with exemplary embodiments of the present invention. As can be seen from this window, all active viewers may be displayed by user name along with an iconic indication of which broadcast platform each user is viewing from. An icon may also be used to show VIP status, which may be achieved in any desired manner, such as by subscription, and a participation score that may be based, for example, by cumulative tips given across multiple broadcast platforms (such as a ranking list showing top 5 tippers across platforms). As this information is all tallied and stored within the database, and is not stored within the individual broadcast platforms, the information therein may be summed across all broadcast platforms.

FIG. 7 is a chat container window in accordance with exemplary embodiments of the present invention. As may be seen herein, the content creator may select from a dropdown list of broadcast platforms represented by icons and may then proceed to type and send a desired message. In this way, the dropdown list may be used to select the target broadcast platform, as discussed above. A total of tips or tokens per broadcast platform may be displayed above the text window and above that, a chat history across broadcast platforms may be displayed. The chat history may be color coded and/or may show an icon to represent the broadcast platform the message originated from. Viewer usernames may also be associated with each message, as well as a brief tipping history, such as a total amount of tips given that day and overall.

Figure 8:
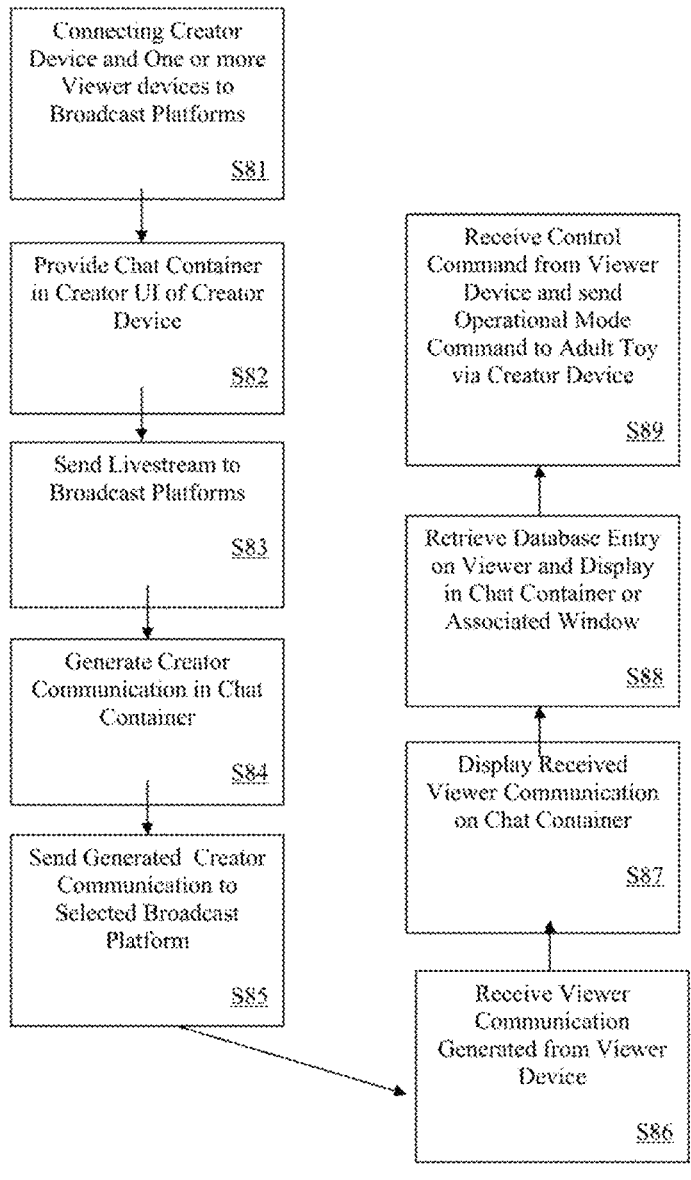
FIG. 8 is a flow chart illustrating an approach for processing information across broadcasting platforms in accordance with exemplary embodiments of the present disclosure.

FIG. 8 is a flow chart illustrating an approach for processing information across broadcasting platforms in accordance with exemplary embodiments of the present disclosure. First, the creator terminal (referred to here as the "creator device") may be connected to one or more viewer terminals (referred to here as the "viewer devices"), via multiple broadcast platforms, for example, in the arrangement described above (Step S81). Then, a chat container may be provided within a creator user interface (UI) of the creator device (Step S82). Next, the creator device may generate a live stream and the live stream may be sent to each of the broadcast platforms for simultaneous display (Step S83). The content creator may generate a multimedia message within the chat container (Step S84) and this multimedia message may be sent to target broadcast platform(s) (Step S85) where they may be observed by the respective viewers.

The viewers may also generate multimedia messages using the viewer devices and these messages may be received (Step S86) and then displayed within the chat container (Step S87). Database entries relating to one or more viewers may be retrieved, either by the request of the content creator, or automatically in association with a viewer message, and then displayed either within the chat container or an associated window (Step S88). A control command for an operational mode of an adult toy may be received from a user via a corresponding broadcast platform and the control command may then be sent by a local wired or wireless connection from the content creator device to the adult toy (Step S89).

It is noted that in the approaches described above, the content creator is able to more easily see communications across multiple broadcast platforms and send communications to target broadcast platforms, thereby allowing the content creator to conduct simultaneous but separate conversations across multiple broadcast platforms. However, according to another approach, the control server may implement a chat relay mode in which a communication made by a viewer within a first broadcast platform is reproduced within the other broadcast platforms and communications made by the content creator are sent to all broadcast platforms so that the viewers of all broadcast platforms can see messages sent by viewers of other broadcast platforms, thereby creating a single discussion group across multiple broadcast platforms. This may be performed, for example, by the control server receiving a message sent by a viewer in one broadcast platform and then automatically posting that same message, along with an indication of who generated that message and which broadcast platform the message was generated on, to the other broadcast platforms, through the user account of the content creator.

As discussed above, the content creator and/or one or more of the viewers may have adult toys or other related devices connected to their respective terminal devices. Thus, according to one approach, the content creator may have remote control over the operational modes of an adult toy or other peripheral of one or more users. Information related to which adult toys or peripherals are accessible to the content creator may additionally be displayed within the chat container and/or stored within the database. The chat container may, for example, display an icon next to a viewer's username to represent that an adult toy or peripheral is accessible to the content creator and what type of adult toy or peripheral it might be. This display may also indicate whether the adult toy or other peripheral is currently accessible to the content creator and what operational modes are available. The content creator may be able to control the adult toy or peripheral directly from the chat container, or may use the chat container to open a new window for adult toy/peripheral operational mode control. While the adult toy may be any device for providing sexual stimulation to a user, the peripheral may be any remotely accessible smart device or Internet of Things device, such as smart lights, music, climate control devices, etc.

It is noted that the chat container, while being principally text and icon based, may also incorporate text-to-speech capabilities to allow the content creator to listen to the incoming messages read aloud and may also incorporate speech-to-text capabilities to allow the content creator to dictate new messages. The content creator may also be able to dictate one or more control commands to control an adult toy/peripheral of a user, or perform any other function mentioned herein as being associated with the present disclosure, by voice command.

Figure 9:
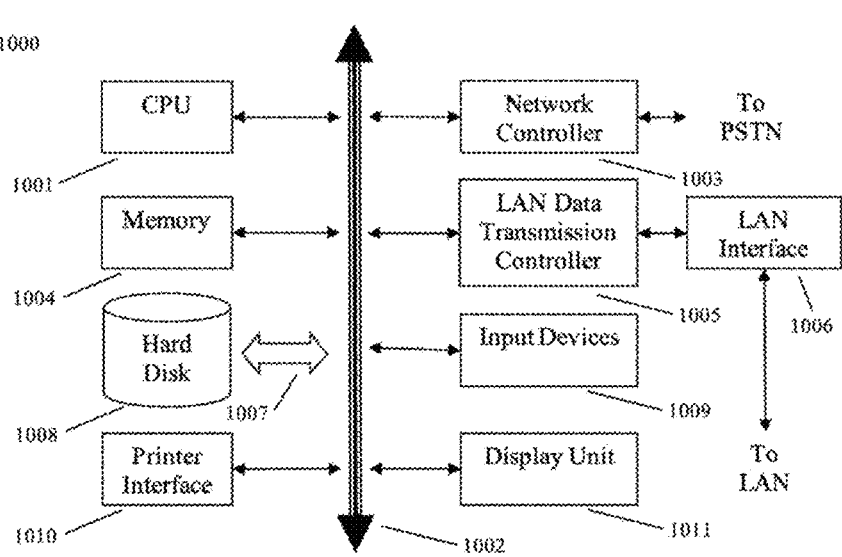
FIG. 9 shows an example of a computer system capable of implementing the method and apparatus according to embodiments of the present disclosure.

FIG. 9 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

In some embodiments, the chat container may be a functional module integrated in the interface of a user device (viewer device). the chat container integrates multiple key functions of the viewer's interaction with the content creator in a unified interface, which greatly enhances the viewer's interactive experience and operational convenience. Without switching between different interfaces or platforms, viewers can complete all-round interactions with the content creator, including chatting, obtaining information, rewarding, controlling toys, participating in interactive decision-making, etc. the chat container breaks the limitations of traditional live broadcasting or interactive platforms, which are characterized by dispersed functionalities and cumbersome operations. Through real-time data connection and integrated design, it realizes timely update of information and efficient interaction. For example, the reward feedback mechanism, unique virtual gift interactive effects, reward target display and progress tracking, etc., all provide a richer and more interesting interactive experience for the viewer, which stimulates the viewer's enthusiasm for participation, and at the same time establishes a closer connection between the content creator and the viewer, which helps to improve the platform's activity and user stickiness. By way of example, in the case where the user device may be a viewer device and the chat partner device may be a content creator device, there are the following embodiments.

A drop-down menu or sidebar in the chat container interface lists all available adult content creator avatars and nicknames. The viewer clicks on the corresponding content creator option to quickly switch to the chat window with that content creator, and the input box is automatically focused for direct message sending. For example, if the viewer is chatting with content creator A, and wants to communicate with content creator B, he/she just needs to select content creator B in the drop-down menu, and the chat window will be switched instantly, and the previous chat record with content creator A will be saved automatically, so that it won't be affected by switching back to continue the communication again. In addition, at the top of the chat container, a horizontal scrolling quick switch bar is set up, displaying the avatars and nicknames of the content creators of different platforms that the viewer are following, and the avatars have the platform identifiers (e.g., small icons of the platform logos). The viewer can quickly switch to the chat interface with different content creators by sliding the switch bar left and right, with smooth transition of the chat window and retention of the chat log and unread message alerts when switching. Clicking on the content creator's avatar also brings up a drop-down menu to view more information about the content creator (e.g., biography, upcoming events), and to set up a no-disturb message or toggle the chat to the top of the list.

The chat container establishes a real-time data connection with the live broadcasting platform or management system where the content creator is located, and obtains the online status of the content creator (e.g. online, offline, busy, etc.) and current activity information (live broadcasting title, whether the interactive session is in progress, etc.) through the interface and displays them with eye-catching icons or text prompts next to the creator's avatar or in the chat room. next to the creator's avatar or at the top of the chat window. In addition, the chat container provides a detailed content creator profile page, which includes the content creator's hobbies, talents and past works in addition to basic information. Viewers can access this page at any time through shortcuts during the chat to deepen their understanding of the content creator and provide more topics and inspiration for interaction.

In the chat container, a special community board or group function is created so that the viewer can create or join groups according to the content creator they are interested in. The group supports sending messages in various forms, such as text, pictures, emoticons, etc., and the viewer can also like and comment on the messages to realize the interactive communication between the viewer. Viewers can communicate with other users who follow the same content creator in the chat container, share their feelings, experiences or tips, and enhance socialization and participation, such as creating a specific content creator fan group chat.

The chat interface of the chat container is also configured with a reward operation area for the viewer's device, where the viewer can click a predetermined reward button (etc. tip button) to reward content creators of different platforms with the same amount or different random amounts at the same time. Alternatively, the viewer may first select the content creator to be rewarded on the chat interface of the chat container, and then the viewer clicks the predetermined reward button on the reward operation area to simultaneously reward (etc. tip) the selected content creator with the same amount or different random amounts.

The chatting interface of the chatting container is set with chat replies scheduled by the system or scheduled by the viewer, and the viewer can select the relevant scheduled chat replies and send them to the content creators of different platforms as a group, and the viewer can also select the content creator to be chatted with on the chatting interface of the chatting container, and then the viewer can make the same reward or different random amounts of reward to the selected content creator simultaneously by clicking the scheduled reward button on the reward operation area. The viewer can then chat with the selected content creator(s) or select a predefined chat reply term on the chat interface.

The back-end of the chat container is connected to the reward statistics system in real time, and the leaderboard data is updated every certain time (e.g. 1 minute). The leaderboard is displayed as a list, including the content creator's avatar, nickname, real-time reward amount, ranking change arrows (up or down), and highlights (e.g., larger fonts, special colors, or medallion logos) for the top rewarders (the top few). The Leaderboard can be set on the front page of the chat container or on a separate "Reward Leaderboard" page, so that viewers can check it at any time.

When a viewer completes a reward operation, the chat container immediately receives a feedback message that the reward was successful, triggering a pre-set feedback mechanism. The feedback message is presented as a pop-up window or scrolling display at the bottom of the chat window, including a thank you message (e.g., "Thank you for your generous reward, content creator J feels your support!")), a description of the privileges granted (e.g. "You have unlocked an exclusive emoticon pack, which can be used in chat") and a reminder of the unlocking of a special toy control mode (e.g. "You can now control content creator J's toys using the powerful vibration mode"), as well as in the viewer's profile or at the bottom of the chat window.), while updating the privilege status in the viewer's profile or settings screen. In addition, when a viewer sends a virtual gift in a chat container, unique interactive effects can be triggered in the chat window, in addition to the usual effects displayed on the content creator's end. For example, if a specific flower gift is sent, flower petals will fall from the chat window; if a love gift is sent, the chat background will briefly change to a pink love theme. If the viewer sends three specific gifts in the chat container at the same time, the virtual scene where the viewer's device shows the content creator changes (e.g., from a normal room to a romantic beach scene) and the viewer receives a special badge or point reward.

In the chat container, a separate reward goal display area is set up for each content creator, where the goal content (e.g., unlocking a new costume, performing a special show, etc.) is displayed in graphic form, alongside a progress bar and real-time updates of the amount raised and the remaining amount. The color and length of the progress bar changes dynamically according to the reward progress, and when it reaches a certain stage (e.g. 50%, 80%, etc.), the progress bar will flash or change color to remind the viewer.

A dedicated toy control area is created in the chat container, where the GUI displays the outline of the content creator's toys and labels the parts that can be controlled (e.g., vibration area, rotation area, etc.). Each control part corresponds to an operation button or slider, with clear text description on the button (e.g. "weak vibration", "strong vibration", "fast rotation", "slow rotation", etc.). "Slow Rotation", etc.), and a short video link to the operation instructions, which the viewer can click to watch a detailed operation demonstration.

In the settings of the chat container, the viewer are provided with a variety of customization options for message alerts, including sound (different alert sound effects can be selected), vibration (adjustable vibration intensity and mode), pop-up window (pop-up window style and display time can be set), etc. Meanwhile, messages are classified according to their sources and importance, such as system messages (e.g. platform announcements, update notifications, etc.), content creator replies, other viewer messages, etc. Each type of message is distinguished by a different color or icon marking in the chat window, and individual reminder rules can be set. For example, system messages can be set to display only a summary of important content in a pop-up window, content creator replies can be set to be alerted by both sound and pop-up window, and other viewer messages can be set to be alerted by vibration only.

The chat container automatically records all chat logs, bounty logs and toy control logs between viewers and content creator, and stores these data on a cloud server associated with the viewer's account. A "History" button is set in the chat window, viewers can click it to enter the history page, which displays all the records in the form of a timeline or a categorized list. Chat records can be clicked directly to view details, reward records show the amount, time and object of the reward, and toy control records show the time, mode and effect of the control and other information. Viewers can also search (e.g. by keywords, date range, etc.), filter (e.g. view only records of a specific content creator) and mark (e.g. mark important interaction records) the history records, making it easy to quickly find the content they want to review.

The content creator presents a number of performance or interaction-related options (e.g., choose the next performance costume style, toy control scene) to the viewer of the viewer device via the content creator device, and the viewer votes in the chat container. The results of the vote are fed back in real time and influence the subsequent behavior of the content creator, allowing the viewer to feel that they have some control over the interactive content.

The viewer can share the exciting chat records, reward achievements, and interesting moments of controlling toys with the content creator in the chat container to social media platforms with one click, attracting more friends' attention and participation, as well as showcasing their own unique experiences. The shared content can be automatically generated in attractive graphic or short video format for easy distribution.

The chat container is set up with an invite-friends function, where the viewer invite new users to register and interact with content creator by sharing an exclusive link. Both the inviter and the invitee can get rewards, such as free bounty tokens, extended interaction time, unlocking special toy control modes, etc. This encourages the viewer to actively promote the platform and expand the user base.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for processing communication across multiple broadcast platforms, including:

providing a chat container in a user interface of a user device, wherein the chat container is configured to provide centralized information management across a plurality of broadcast platforms, and wherein at least a first chat partner device of a plurality of chat partner devices connects to the user device via a first broadcast platform of the plurality of broadcast platforms, and at least a second chat partner device of the plurality of chat partner devices connects to the user device via a second broadcast platform of the plurality of broadcast platforms;

responsive to a selection operation on the chat container, selecting one or more broadcast platforms of the plurality of broadcast platforms as a target broadcast platform; and responsive to a messaging operation on the chat container, sending a user message to at least one chat partner device among the plurality of chat partner devices, wherein the at least one chat partner device is in communication with the user device via the target broadcast platform, wherein the chat container is configured to display the user message, a text message of a user of the first chat partner device from the first broadcast platform, and a text message of a user of the second chat partner device from the second broadcast platform, and wherein the chat container is further configured to display a username of the user of the first chat partner device, and an interaction history of the user of the first chat partner proximate to the display of the text message of the user of the first chat partner device, and wherein the chat container is further configured to display a username of the user of the second chat partner device, and an interaction history of the user of the second chat partner device proximate to the display of the text message of the user of the second chat partner device;

wherein the interaction history is coded and/or shows an icon to represent the broadcast platform interaction information of the interaction history originated from.

2. The method of claim 1, wherein the user device is connected to a database storing first information pertaining to the user of the first chat partner device on the first broadcast platform and storing second information pertaining to the user of the second chat partner device on the second broadcast platform and the first and second information are retrieved from the database and displayed within the chat container, and wherein the chat container includes an element for entering information that is additionally stored in the database for subsequent retrieval and display within the chat container.

3. The method of claim 2, wherein the user device is configured to broadcast a video stream and send user messages to the plurality of chat partner devices via at least one of the plurality of broadcast platforms, and each of the plurality of the chat partner devices is configured to watch the broadcasted video stream and send the interaction information to the user device via at least one of the plurality of broadcast platforms.

4. The method of claim 3, wherein the interaction information includes a comment message, a private message, a tipping message, and statistical data, associated with a particular chat partner device among the plurality of chat partner devices, wherein the comment message includes a chat partner ID, comment content, comment time, and a broadcast platform name corresponding to a particular broadcast platform, among the plurality of broadcast platforms, associated with the particular chat partner device;

wherein the tipping message includes the chat partner ID, a tipping value, a tipping time, and the broadcast platform name, via which the tipping message is sent; and wherein the statistical data includes a number of chat partner devices of the plurality of chat partner devices, tipping statistics for the particular broadcast platform of the plurality of broadcast platforms, tipping statistics for the particular chat partner device, of the plurality of chat partner devices, and identity information for the particular chat partner device, of the plurality of chat partner devices.

5. The method of claim 4, further comprising:

responsive to a reply operation on the comment message or the tipping message in the chat container, a reply message is sent from the user device to the at least one chat partner device, of the plurality of chat partner devices, and is synchronously shown in the particular broadcast platform, of the plurality of broadcast platforms, via which the at least one chat partner device is in communication with the user device.

6. The method of claim 4, wherein the interaction information further includes an indication that a particular chat partner device, of the plurality of chat partner devices, is associated with a peripheral device.

7. The method of claim 6, wherein the peripheral device is an adult toy, wherein the adult toy is connected to the particular chat partner device by a wired or wireless connection, and the indication includes information pertaining to whether the wired or wireless connection is operational and/or information pertaining to a type of the adult toy.

8. The method of claim 2, wherein in the step of displaying, through the chat container, interaction information from the plurality of broadcast platforms, includes:

responsive to receiving front-end data from the plurality of broadcast platforms, processing the front-end data to obtain the interaction information to be displayed through the chat container; or receiving the interaction information from the at least one of the plurality of broadcast platforms to the chat container based on a software development kit which interfaces the chat container with the target broadcast platform, wherein the software development kit is integrated into a development of the at least one of the plurality of broadcast platforms.

9. The method of claim 1, wherein the chat container is presented as a floating window on a web page, as an embedded element in a web page, and/or as an independent client application.

10. The method of claim 9, wherein each of the plurality of broadcast platforms is separately displayed on different web pages, and the chat container is presented in one of the web pages for a particular broadcast platform.

11. The method of claim 1, wherein the step of selecting one or more broadcast platforms as the target broadcast platform includes:

based on the target broadcast platform and the user message, calling a preprogrammed script to simulate an input operation on a web interface associated with the target broadcast platform, so as to send the user message to the target broadcast platform; or sending the user message from the chat container to the target broadcast platform based on a software development kit which interfaces the chat container with the target broadcast platform, wherein the software development kit is integrated into a development of the target broadcast platform.

12. A system for communication across multiple broadcast platforms, including:

a control server for connecting to a first broadcast platform, a second broadcast platform, and generating a chat container;

a user terminal for displaying the chat container, generating a live stream broadcast, transmitting the live stream broadcast to each of the first and second broadcast platforms, and transmitting a user message to a target broadcast platform, wherein the chat container is configured to input the user message and select the target broadcast platform from among the first and second broadcast platforms;

a first chat partner terminal connected to the first broadcast platform and configured to receive the generated live stream broadcast therethrough and further configured to receive the user message when selected as the target broadcast platform; and a second chat partner terminal connected to the second broadcast platform and configured to receive the generated live stream broadcast therethrough and further configured to receive the user message when selected as the target broadcast platform, and wherein the chat container is further configured to display a username of a user of the first chat partner device, and an interaction history of the user of the first chat partner device proximate to the display of the text message of the user of the first chat partner device, and wherein the chat container is further configured to display a username of a user of the second chat partner device, and an interaction history of the user of the second chat partner device proximate to the display of the text message of the user of the second chat partner device;

wherein the interaction history is coded and/or shows an icon to represent the broadcast platform interaction information of the interaction history originated from.

13. The system of claim 12, the user terminal is further configured to receive interaction information from the first broadcast platform and/or the second broadcast platform through the chat container, wherein the interaction information is associated with at least one chat partner device in communication with the user device via at least one of the first broadcast platform and/or the second broadcast platform.

14. The system of claim 12, wherein the system further comprises a database connected to either the control server or the user terminal and configured to store and retrieve the first and second database entry as well as tipping histories of the first and second users.

15. The system of claim 12, wherein the first and second database entries are each represented by an icon within the chat container.

16. The system of claim 12, wherein the first and second database entries include a history of tips made within a predetermined time period, subscription participation information, or VIP status information.

17. The system of claim 12, wherein the first and second database entries include a history of tips made within a predetermined time period across multiple different broadcast platforms including the first broadcast platform and the second broadcast platform.

18. A non-transitory computer-readable medium storing a program including instructions that, when executed by a processor, causes communication to be processed across multiple broadcast platforms, by:

providing a chat container in a user interface of a user device, wherein the chat container is configured to provide centralized information management across a plurality of broadcast platforms, and wherein at least a first chat partner device of a plurality of chat partner devices connects to the user device via a first broadcast platform of the plurality of broadcast platforms, and at least a second chat partner device of the plurality of chat partner devices connects to the user device via a second broadcast platform of the plurality of broadcast platforms;

responsive to a selection operation on the chat container, selecting one or more broadcast platforms of the plurality of broadcast platforms as a target broadcast platform; and responsive to a messaging operation on the chat container, sending a user message to at least one chat partner device among the plurality of chat partner devices, wherein the at least one chat partner device is in communication with the user device via the target broadcast platform, wherein the user device is connected to a database storing first information pertaining to a history of tips provided by a user of the first chat partner device to the user within a predetermined time period and storing second information pertaining to a history of tips provided by a user of the second chat partner device to the user within the predetermined time period and the first and second information are retrieved from the database and displayed within the chat container as lists of tips given within the predetermined time period along with total values of the tips given, wherein the chat container is configured to display the user message and a text message of the user of the at least one chat partner device, and wherein the chat container is further configured to display a username of the user of the first chat partner device, and an interaction history of the user of the first chat partner device proximate to the display of the text message of the user of the first chat partner device, and wherein the chat container is further configured to display a username of the user of the second chat partner device, and an interaction history of the user of the second chat partner device proximate to the display of the text message of the user of the second chat partner device;

wherein the interaction history is coded and/or shows an icon to represent the broadcast platform interaction information of the interaction history originated from.

19. The non-transitory computer-readable medium according to claim 18, wherein the instructions, when executed by the processor, further cause:

displaying, through the chat container, interaction information from the plurality of broadcast platforms, wherein the interaction information is associated with at least one chat partner device in communication with the user device via at least one of the plurality of broadcast platforms.

20. The non-transitory computer-readable medium according to claim 19, wherein:

the interaction information includes a comment message, a private message, a tipping message, and/or statistical data, wherein the comment message includes a chat partner ID, comment content, comment time, and/or a name of a particular broadcast platform, among the plurality of broadcast platforms, via which the comment message is sent;

wherein the tipping message includes the chat partner ID, a tipping value, a tipping time, and/or the name of the particular broadcast platform, among the plurality of broadcast platforms, via which the tipping message is sent; and wherein the statistical data includes a number of chat partner devices of the plurality of chat partner devices, tipping statistics for the particular broadcast platform of the plurality of broadcast platforms, tipping statistics for a particular chat partner device, of the plurality of chat partner devices, and/or identity information for a particular chat partner device, of the plurality of chat partner devices.

* * * * *